United States Patent Office 3,770,740
Patented Nov. 6, 1973

3,770,740
3-ALKYL-4-BIS-(2 - HYDROXYETHYL)AMINO-6-(5-NITRO-2-FURYL)-ISOXAZOLO[5,4-d]PYRIMIDINES
Homer Albert Burch, Norwich, N.Y., assignor to Morton-Norwich Products, Inc.
No Drawing. Filed May 16, 1972, Ser. No. 253,852
Int. Cl. C07d 51/46
U.S. Cl. 260—256.4 F                3 Claims

ABSTRACT OF THE DISCLOSURE

3 - alkyl - 4 - bis(2 - hydroxyethyl)amino - 6 - (5 - nitro - 2 - furyl)isoxazolo[5,4 - d]pyrimidines are useful antibacterial agents.

This invention relates to 3-alkyl-4-bis(2-hydroxyethyl) amino-6-(5-nitro - 2 - furyl)isoxazolo[5,4-d]pyrimidines. They can be prepared according to the following examples:

EXAMPLE I (A) N-(4-cyano-3-methylisoxazolyl)-2-furamide

To a stirred solution of 940 g. (7.65 moles) 5-amino-4-cyano-3-methylisoxazole in 1 l. of pyridine was added slowly 995 g. (7.65 moles) of furoyl chloride. After completing the addition the solution was heated on a steam bath for 2 hrs. and poured into 4 l. of ice water. The crude product was filtered, pressed as dry as possible, and resuspended in 2 l. of cold water. The mixture was acidified with concentrated hydrochloric acid, filtered, and the product washed free of traces of pyridine with water. Drying for 3 days at 65° gave 300 g. (54.2%).

Recrystallization of 40 g. from dilute aqueous methanol (Darco) gave 24.6 g. of product as colorless needles melting at 225–227° (corr.).

(B) 6-(2-furyl)-3-methylisoxazolo[5,4-d]pyrimidin-4(5H)-one

Two-hundred seventeen g. (1.0 mole) of (A) was added in small portions during about 1 hr. to a stirred, warm (50–60°) solution of 510 g. sodium hydroxide pellets and 850 ml. of 30% hydrogen peroxide in 2 l. of water. Considerable effervescene occurred necessitating the periodic addition of a few mls. of ethyl acetate. After the exothermic reaction had ceased (0.5–1 hr.) the mixture was heated on a steam bath for 2–3 hrs. The clear solution was chilled, acidified slowly with glacial acetic acid, and filtered. The crude product was washed thoroughly with cold water, and dried a few days at 65° to give 188 g. (86.6%).

Fifty grams of crude product was boiled in 3 l. of nitromethane with 10 g. of Darco, filtered, and the filtrate chilled. After filtering the recrystallized product, the Darco residue was boiled again with the mother liquor. This procedure was repeated five times to give a total of 42.4 g. product as colorless needles melting at 305–307° (corr.).

Analysis.—Calcd. for $C_{10}H_7N_3O_3$ (percent): C, 55.30; H, 3.25; N, 19.35. Found (percent): C, 55.42, 55.22; H, 3.39, 3.28; N, 19.43, 19.54.

(C) 3-methyl-6-(5-nitro-2-furyl)isoxazolo[5,4-d]pyrimidine-4(5H)-one

To 200 ml. of concentrated sulfuric acid at 25–30° was added with stirring 72.5 g. (0.334 mole) of (B) in portions. External cooling was necessary. A solution of 33 ml. concentrated nitric acid in 65 ml. of concentrated sulfuric acid was added dropwise at 25–30° with cooling during 15 mins. The temperature was kept at about 25° for 10 mins. following the addition and then lowered below 10° for 1 hr. The mixture was poured cautiously into 2 l. of ice water. The crude product was filtered, washed with water and dried at 65° to give 30.0 g. (34.3%). Recrystallization of 40 g. from dilute aqueous dimethylformamide (Darco) gave the product as yellow crystals decomposing at 327° (corr.) in a yield of 23.7 g.

Analysis.—Calcd. for $C_{10}H_6N_4O_5$ (percent): C, 45.81; H, 2.31; N, 21.37. Found (percent): C, 45.90, 45.81; H, 2.24, 2.33; N, 21.21, 21.21.

(D) 4-bis(2-hydroxyethyl)amino-3-methyl-6-(5-nitro-2-furyl)isoxazolo[5,4-d]-pyrimidine A solution of 18 g. (0.07 mole) of (C) and 14.3 g. of phosphorus pentachloride in 200 ml. of thionyl chloride was refluxed on a steam bath for 5 hrs., concentrated nearly to dryness in vacuo on a steam bath, and the cooled residue shaken with ether. The crude product was filtered, washed with ether, and air dried to give 9.0 g. (47%).

Several recrystallizations of a sample from aqueous dimethylformamide (Darco) gave the product as tan needles melting at 188.5–189.5° (corr.).

A solution of 40 g. (0.15 mole) of chloro compound and 33 g. (0.3 mole) of diethanolamine in 250 ml. of dimethylformamide was heated with stirring for 6 hrs., diluted with 50 ml. of water, and chilled. The crude product was filtered and washed with water. Recrystallization from aqueous dimethylformamide (Darco) gave the product as yellow needles melting at 203–204° (corr.) in a yield of 25 g. (47.8%).

Analysis.—Calcd. for $C_{14}H_{15}N_5O_6$ (percent): C, 48.14; H, 4.33; N, 20.05. Found (percent): C, 48.08, 48.02; H, 4.43, 4.35; N, 19.83, 19.73.

EXAMPLE II (A) N-(4-cyano-3-ethyl-5-isoxazolyl)-2-furamide

To a solution of 192 g. (1.4 moles) 5-amino-4-cyano-3-ethylisoxazole in 500 ml. of pyridine was added dropwise with stirring 183 g. (1.4 moles) of furoyl chloride. The hot solution was heated on a steam bath for 1 hr. and poured into 4 l. of cracked ice. The final volume was adjusted to about 5 l. with water, and the mixture was stirred in the cold for 2 hrs. The product was filtered, pressed as dry as possible, and resuspended in 3 l. of cold water. The mixture was acidified with concentrated hydrochloric acid and again filtered, and washed with water to remove final traces of pyridine. The crude product was dried for two days at 65° to give 271 g. (83.7%).

Recrystallization of 46 g. from dilute aqueous methanol (Darco) gave 31 g. of product as pale tan needles melting at 170–171.5° (corr.).

(B) 3-ethyl-6-(2-furyl)isoaxazolo[5,4-d]pyrimidin-4(5H)-one

To a warm (50–60°) solution of 540 g. sodium hydroxide pellets in 2 l. of water was added carefully 1 l. of 30% hydrogen peroxide. Two-hundred fifty g. (1.05 moles) of (A) was added in small portions with vigorous stirring during 1 hr. Excessive foaming was controlled by periodically adding a few mls. of ethyl acetate. When the exothermic reaction had subsided (0.5–1 hr.) the mixture was heated cautiously on a steam bath for 3 hrs., cooled, and neutralized slowly by adding glacial acetic acid. The crude product was filtered, washed with water, and dried at 65° to give 190 g. (76%).

Recrystallization of 41 g. from nitromethane (Darco) gave 31 g. of product as colorless needles decomposing at 263–265° (corr.).

(C) 3-ethyl-6-(5-nitro-2-furyl)isoxazolo[5,4-d]pyrimidin-4(5H)-one

To 600 ml. of concentrated sulfuric acid was added in portions with stirring and cooling below 25° 247 g.

(1.04 moles) of (B). A solution of 100 ml. concentrated nitric acid in 200 ml. of concentrated sulfur acid was added dropwise at 20–25° with cooling. Following the addition the temperature was kept at 20–25° for 10 mins., and then at 10° for 1 hr. The solution was poured cautiously with stirring into 4 kgs. of ice and water. The crude product was filtered, washed thoroughly with cold water, and dried at 65° to give 130 g. (44.2%). Recrystallization of 60 g. from dilute aqueous dimethylformamide (Darco) gave 33.9 g. of pale yellow needles melting at 280–282° dec. (corr.).

*Analysis.*—Calcd. for $C_{11}H_8N_4O_5$ (percent): C, 47.83; H, 2.92; N, 20.29. Found (percent): C, 47.87, 47.87; H, 2.95, 2.94; N, 20.06, 20.13.

(D) 3-ethyl-4-bis(2-hydroxymethyl)amino-6-(5-nitro-2-furyl)isoxazolo[5,4-d]pyrimidine A mixture of 48.0 g. (0.17 mole) of (C) and 36 g. of phosphorus pentachloride in 200 ml. of phosphorus oxychloride was refluxed with stirring for 2.5 hrs., cooled, and diluted with petroleum ether. The crude product was filtered, washed thoroughly with petrolem ether, and air dried to give 49.0 g. (96%).

A solution of 35.3 g. (0.12 mole) of the chloro compound and 26.9 g. (0.25 mole) of bisethanolamine in 500 ml. of methanol was refluxed with stirring for 8 hrs., concentrated to one-half volume in vacuo, diluted with 200 ml. of water, and chilled. The crude product was filtered, washed with water, and dried at 65°. Recrystallization from nitromethane (Darco) gave the product as yellow crystals melting at 184–185° (corr.) in a yield of 23.1 g. (53.2%).

*Analysis.*—Calcd. for $C_{15}H_{17}N_5O_6$ (percent): C, 49.58; H, 4.72; N, 19.28. Found (percent): C, 49.58, 49.50; H, 4.69, 4.64; N, 19.39, 19.42.

The compounds of this invention are potent antibacterial agents adapted to be combined in various forms such as dusts, solutions, suspensions, unguent and the like employing carriers and adjuvants common to the formulating art. The table here below is exemplary of the antibacterial potency of these compounds.

| Compound | Minimal inhibitory concentration, µg./ml.[a] | | | | | | | |
|---|---|---|---|---|---|---|---|---|
| | Staph. aureus | Dipl. pneumoniae | E. insidiosa | Strep. pyogenes | Strep. agalactiae | E. coli | S. typhosa | A. aerogene |
| Example I | 1.5 | 0.38 | 0.048 | 1.5 | 1.5 | 0.75 | 1.5 | 12.5 |
| Example II | 1.5 | 1.5 | 3.1 | 6.25 | 3.1 | 1.5 | 3.1 | >50 |

[a] Minimal inhibitory concentration is the lowest concentration of compound that prevents visible growth after 24 hr. incubation.

What is claimed is:

1. A compound of the formula:

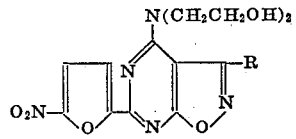

wherein R is methyl or ethyl.

2. The compound of claim 1 wherein R is methyl.
3. The compound of claim 1 wherein R is ethyl.

References Cited
UNITED STATES PATENTS
3,056,781   10/1962   Papesch _____ 260—249.5

ALEX MAZEL, Primary Examiner

R. V. RUSH, Assistant Examiner

U.S. Cl. X.R.
260—999